(12) United States Patent
Blondel et al.

(10) Patent No.: US 11,795,036 B2
(45) Date of Patent: Oct. 24, 2023

(54) METHOD FOR GENERATING A TRAJECTORY FOR A HOISTING APPLIANCE

(71) Applicant: Schneider Electric Industries SAS, Rueil Malmaison (FR)

(72) Inventors: Charles Blondel, Cras (FR); Yannick Bodin, Lachapelle d'Armentières (FR); Edouard Olivier, Roubaix (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 540 days.

(21) Appl. No.: 17/081,479

(22) Filed: Oct. 27, 2020

(65) Prior Publication Data

US 2021/0130139 A1    May 6, 2021

(30) Foreign Application Priority Data

Oct. 30, 2019  (EP) .................................. 19306413

(51) Int. Cl.
*B66C 13/48*    (2006.01)
*G05B 19/4155*  (2006.01)
(Continued)

(52) U.S. Cl.
CPC ............. *B66C 13/48* (2013.01); *B25J 9/1664* (2013.01); *G05B 19/4155* (2013.01);
(Continued)

(58) Field of Classification Search
CPC ......... B66C 17/00; B66C 17/20; B66C 19/00; B66C 11/00; B66C 11/12; B66C 11/14;
(Continued)

(56) References Cited

U.S. PATENT DOCUMENTS

2007/0219662 A1    9/2007    Sawodny et al.

FOREIGN PATENT DOCUMENTS

| JP | 2008152380 A | * | 7/2008 |
| JP | 2008152380 A | | 7/2008 |
| WO | 2019092937 A1 | | 5/2019 |

OTHER PUBLICATIONS

Cao et al., Automatic Control and Simulation of an Overhead Crane's Travel System, 2016, Int. J. of Automation Technology (Year: 2016).*

(Continued)

*Primary Examiner* — Russell Frejd
*Assistant Examiner* — Sara J Lewandroski
(74) *Attorney, Agent, or Firm* — Locke Lord LLP

(57) ABSTRACT

A method for generating a trajectory for a load transported by a hoisting appliance spanning a hoisting area. The method includes providing a 3-dimensional model of the hoisting area with located obstacles within the hoisting area, providing load parameters including load length, height, width and weight. Generating a trajectory for navigating through the hoisting area using the model of the hoisting area and taking in account located obstacles, load parameters; and load movement parameters including a maximum attainable speed of the hoist appliance with the load, wherein the generated trajectory includes a starting point, a target point and a number of consecutive line segments connecting the starting point and the target point. And optimizing the trajectory for speed by maximizing the length of at least one line segment in a main direction of travel in order to travel at a maximum attainable speed of the hoisting appliance with the load in the main direction of travel.

13 Claims, 11 Drawing Sheets

(51) Int. Cl.
*B25J 9/16* (2006.01)
*B66C 17/00* (2006.01)
(52) U.S. Cl.
CPC .... *B66C 17/00* (2013.01); *G05B 2219/40511* (2013.01); *G05B 2219/50392* (2013.01)
(58) Field of Classification Search
CPC .............. B66C 2700/0385; B66C 13/48; B25J 9/1664; B25J 9/1666; G05B 2219/40511; G05B 2219/40426; G05B 2219/40512; G05B 2219/40519; G05B 2219/42342; G05B 2219/50392
See application file for complete search history.

(56) References Cited

OTHER PUBLICATIONS

Extended European Search Report for European Application No. 19306413.6-1017 dated Apr. 23, 2020, 6 pages.

\* cited by examiner

METHOD FOR GENERATING A TRAJECTORY FOR A HOISTING APPLIANCE

The present invention relates to a method for generating a trajectory for a hoisting appliance spanning a hoisting area, the hoisting appliance arranged for carrying a load suspended by cables from a trolley that can move with the hoisting appliance.

BACKGROUND

Hoisting appliances 1 such as bridge cranes, gantry cranes or overhead travelling cranes usually comprise a trolley 2 which can move over a single girder or a set of rails 3 along a horizontal axis X, as shown in FIG. 1. This first movement along the X-axis is generally referred to as short travel movement and/or trolley movement. Depending on the type of appliance, the girder or the set of rails 3, also referred to as bridge, may also be movable along a horizontal axis Y perpendicular to the X-axis, thus enabling the trolley to be moved along both the X- and Y-axes. This second movement along the Y-axis is generally referred to as long travel movement and/or bridge or crane movement. The amount of available short travel along the X-axis and long travel along the Y-axis determines a hoisting area that is spanned by the hoist 1.

A load suspension device 4 is associated with cables which pass through the trolley 2, the length of the cables 5 being controlled by the trolley 2 to vary, thereby enabling displacement of a load 6 along a vertical axis Z, referred to as hoisting movement.

The handling of the load by the hoisting appliance may cause swinging of the load, which is preferably damped in order to perform load transfer smoothly and safely, while minimising the time required for transfer. Such swinging is generated by the acceleration of the horizontal movement or movements of the trolley along the X- and/or Y-axes. This swinging is similar to that of a pendulum, for which the oscillation frequency and amplitude depend on the length of the cables. Various solutions have been developed to help reducing the sway angle of such a suspended load.

Transferring a suspended load across a hall, shipyard, metallurgic or nuclear plant, requires an operator to be very careful to prevent people, obstacles or objects that are present within the hoisting area from being hit or damaged in any way. Hence, in addition to size, swinging of the suspended load, commonly referred to as sway, is something that the operator needs to take in account when manoeuvring the load across the working place along a trajectory within the boundaries of the hoisting area.

This complexity is what has hampered development of fully automated hoisting systems being capable of transferring suspended loads independently along a trajectory. Accordingly, there is a need for developing cranes that can adjust the trajectory to take in account the presence of people, obstacles and/or objects while maintaining safety and timing conditions.

SUMMARY OF INVENTION

It is an object of the invention to provide a hoisting appliance that may self-transfer a suspended load automatically and independently.

According to the invention, this object is achieved by providing a method for generating a trajectory for a hoisting appliance spanning a hoisting area, the method including providing a 3-dimensional model of the hoisting area with located objects within the hoisting area, providing load parameters comprising load length, height, width and weight, and generating a trajectory for navigating through the hoisting area using the model of the hoisting area and taking in account located objects, load parameters; and load movement parameters including a maximum attainable speed of the hoist appliance with the load. Wherein the generated trajectory has a starting point, a target point and a number of consecutive line segments connecting the starting point and the target point. And optimizing the trajectory for speed by maximizing the length of at least one line segment in a main direction of travel in order to travel at a maximum attainable speed of the hoisting appliance with the load in the main direction of travel.

As it minimizes the number of consecutive line segments changes, and thus, the number of direction changes, the generated trajectory is thereby adapted to favor the maximum travel speed instead of distance.

In another aspect the invention relates to a control device configured for performing the method as disclosed. Such a control device may be part of a hoisting appliance. Also, it may be part of a hoisting crane.

A main difference when determining a trajectory for hoisting appliances in contrast to vehicles, such as e.g. cars, is that the speeds of the hoist in the X and Y directions are independent of each other. Meaning that for a vehicle cornering at a certain angle the speed in X and Y direction are correlated. Also, for a hoisting appliance the speed in the third Z direction is independent of speed in both X and Y direction. The speeds in X and Y direction do have an impact on the amount of sway, i.e. amplitude of the load carried by the hoist, but the main parameter determining maximum sway is the length of the pendulum i.e. the cables. Hence, the height Z controlled by the hoist foremostly determines swaying and therewith the safety and/or security boundaries that need to be taken in account.

Accordingly, when determining optimal trajectory, the decision to go over an obstacle or to circumvent should take in account the possible height that can be obtained; and consider which of the options provides an optimum. The optimum may be determined based on a higher speed when changing travel direction or based on a shortest path for passing through a particular area.

For example, circumventing a particular obstacle may be done at higher speed when increasing safety margin e.g. to take account of sway and at expense of an increase in path length, whereas going over the obstacle might mean decreasing speed in X or Y direction to accommodate for the time required for hoisting the load to the necessary height.

BRIEF DESCRIPTION OF DRAWINGS

By way of example only, the embodiments of the present disclosure will be described with reference to the accompanying drawing, wherein.

DETAILED DESCRIPTION

Figure 2:
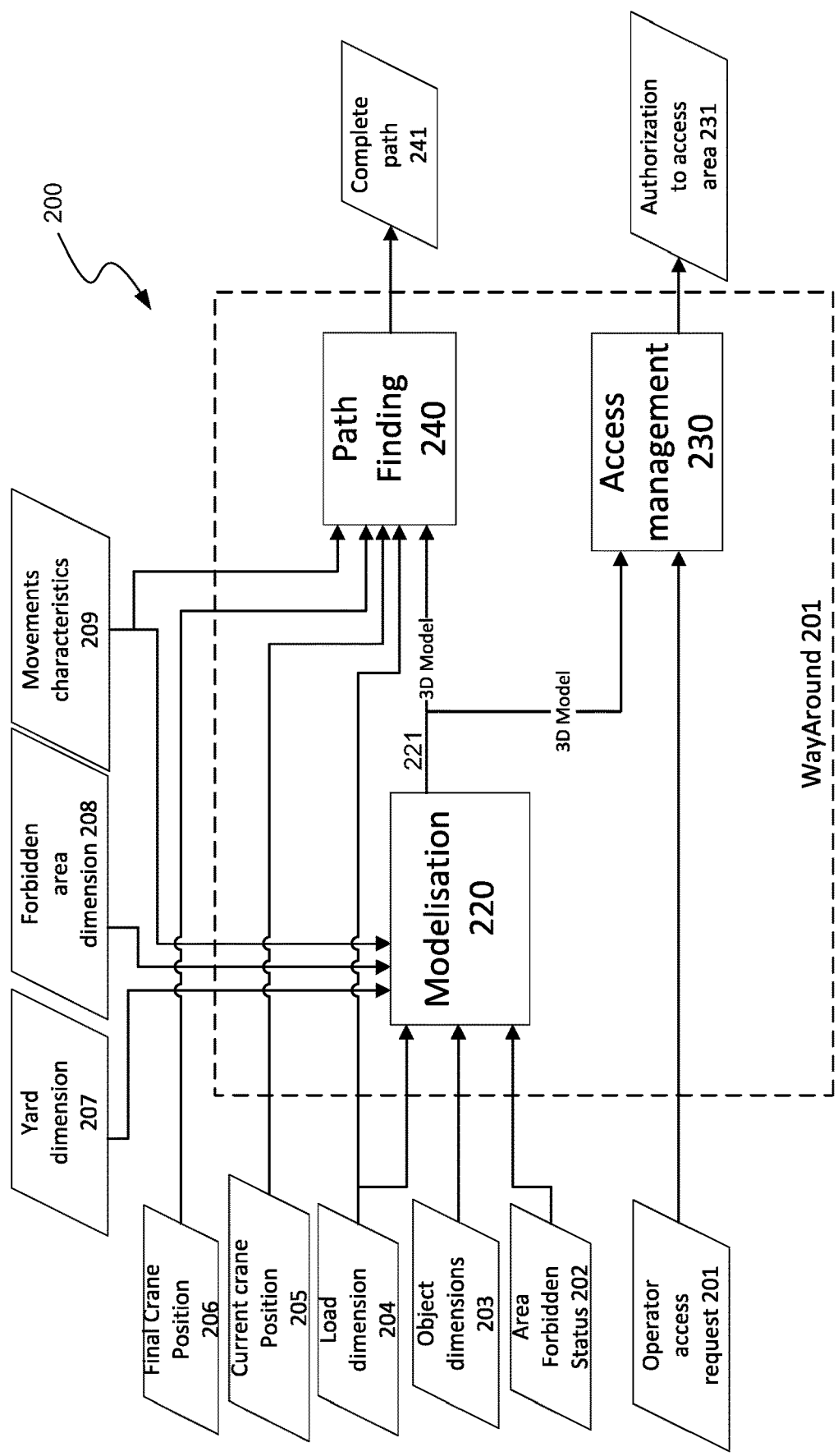
FIG. 2 illustrates an example of a block diagram of a process for creating a path for a hoisting appliance.

Referring to FIG. 2, a block diagram of a general process 200 is shown for creating the path to be followed by the crane for transporting a load from one place within the hoisting area to another. The process may be executed by a control device of a hoisting appliance. The "way around" process 201 for creating the path includes three sub-process. A modelling process 220 for maintaining a 3D model of the hoisting area i.e. the yard and obstacles present therein. An access management process 230 for ensuring that authorization for entering and/or passing through areas is managed. And a path finding process 240 for determining the path to be completed by the hoist. A yard or hall, or other working area, will have an IT control system for supervision of the yard or all. Such a supervisory system, or subsystems thereof, may provide the functionalities for trajectory execution, authorization i.e. access management, and security in general.

The modelling process 220 has as inputs dimensions of the yard itself 207, dimension of obstacles within the yard 203, forbidden areas within the yard 208 and the access status 202 thereof, dimensions 204 of the load selected to be transported, and movement characteristics 209 of the load and of obstacles that may be present within the yard. The output of the modelling process 220 is the 3D model 221 of the hoisting area and all elements therein, i.e. the forbidden areas, obstacles and load.

The access management process 230 has as input data the 3D model 221 and the operator access requests 201. Considering the current trajectory and the current speed of the crane, the access process 230 will then give the access authorizations 231 or it may refuse authorization. The path finding process 240 has input the 3D model 221, the actual or current crane position 205, the desired final crane position 206, the load dimension 204 and movement characteristics 209. The output of the path finding process 240 is the path 241 that is to be completed by the hoist.

The yard dimensions 207 include length and width of the hoisting area spanned by the crane and minimum height specifications, whereas a maximum height is basically determined by the height of the crane itself.

The objects dimensions 203 include length, width, diameter and/or height for each obstacle present in the hoisting are, such as various containers, crates, goods, equipment etc. The objects dimensions 203 may further include the same data for obstacles that are potentially present such as e.g. vehicles and other movable equipment. The load dimensions 204 of the load selected to be transported may be expressed in length, width, diameter, height and/or weight. The movement characteristics 209 of the load and of obstacles may be specified by speed, acceleration, deceleration, maximum sway and/or transport height.

The forbidden areas 208 are areas that have limited or restricted access, and may be specified by length, width and height. These areas may include an operation zone covered by certain equipment, such as conveyor belt, a deployment zone wherein particular equipment is deployed, or an arrival zone where new goods arrive. They may also include walk ways or passage zones where operators and/or other personnel could be walking. The access status 202 of forbidden areas 208 may change over time, when e.g. an equipment is only deployed temporarily or arrival of new goods in the arrival zone only occurs during predetermined time intervals.

The current crane position 205 may be specified as X, Y, Z coordinates within the hoisting area. Likewise, the desired final crane position 206 may be specified similarly.

The output 3D model 221 of the modelling process 220 describes the hoisting area as a spatial model defining free and blocked areas or zones where and/or through which the trolley moved by the crane may travel.

Figure 3:
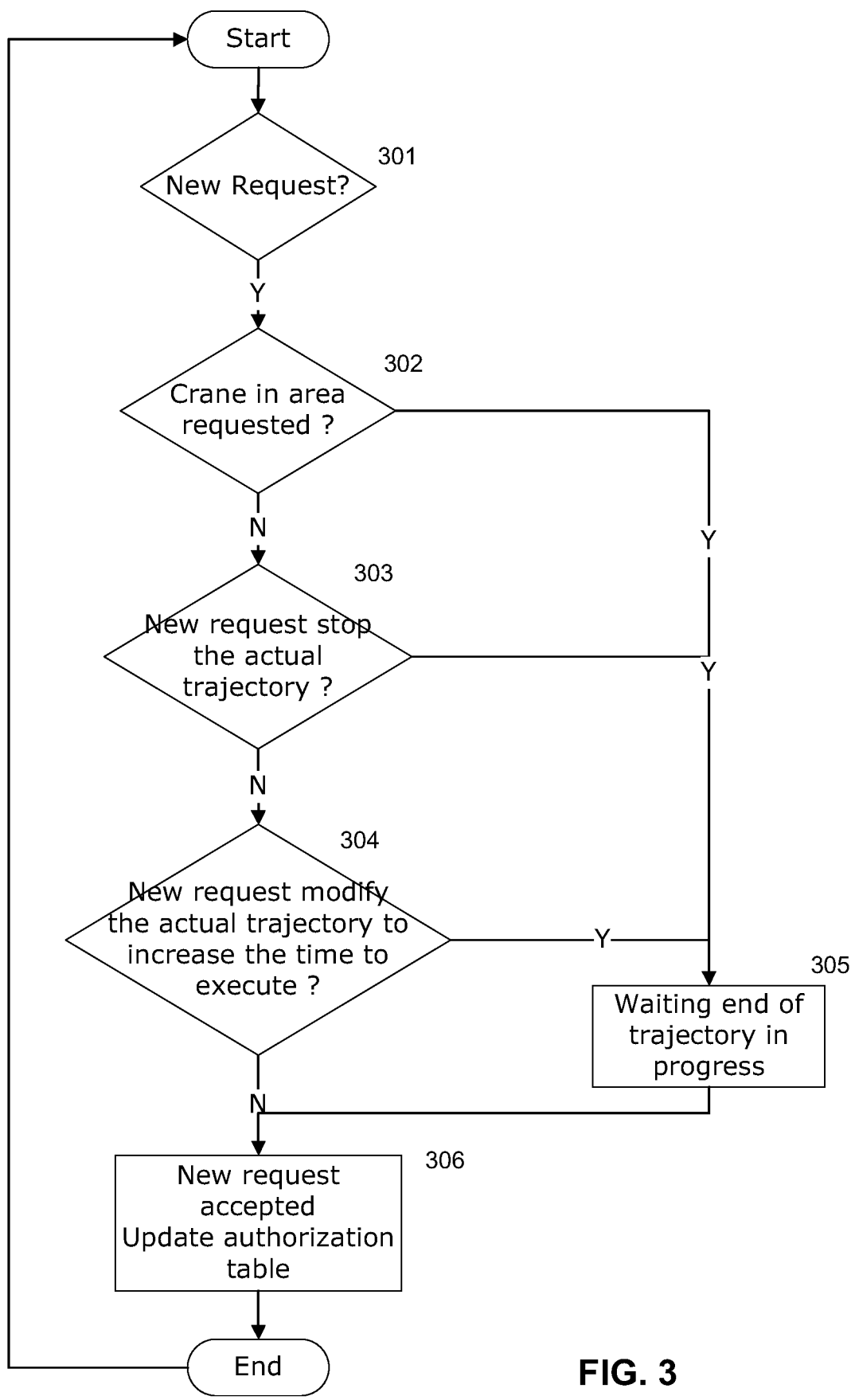
FIG. 3 illustrates an example of a flowchart for access management.

Referring to FIG. 3, an example of a flowchart for the sub-process of access management 230 is shown. Hoisting appliances may be continuously in operation within the hoisting area of for example a shipyard or warehouse, and accordingly may be performing consecutive tasks. Within a shipyard or warehouse some of the areas may be off-limit for various reasons. Hence, management of access to particular areas for performing tasks requested by operators is required.

The process starts with a new access request 301 from an operator for access to a certain area of the industrial yard, while the hoisting appliance, e.g. crane may be transporting a particular load from a start position to a target position. Upon receipt of the new request, it is checked 302 whether the current position of the hoisting equipment is in the area to which the access request is made. If yes, the process waits 305 until the path in progress is finished, after which the new request is accepted 306 and the authorization table is updated. If no, the process continues, and it is checked if the new request would block the current path forcing the crane to stop 303. If yes, stopping is prevented and the process waits 305 until the path in progress is finished. If no, the process continues, and it is checked if the new request would force the crane to modify 304 the current path and would increase the time of execution. If yes, interruption is prevented and the process waits 305 until the path in progress is finished. If the modification due to the interrupting request would not increase execution time, e.g. because an alternative crane path would be available, the new request might be accepted. In addition, a certain tolerance of increased execution time might be applied, which would allow the new request if the increase of execution time of the future path stays within the tolerance threshold. So, if no, the new request is accepted 306 and the authorization table is updated.

The authorization table may be a variable structure that is shared with the supervisory system of the hall or yard. From this information, like current position of the crane and authorization, the supervisory system will be able to monitor the hall or yard in order to authorize personnel to enter an area and to monitor and stop the equipment present in case it would invade this particular area.

Figure 4:
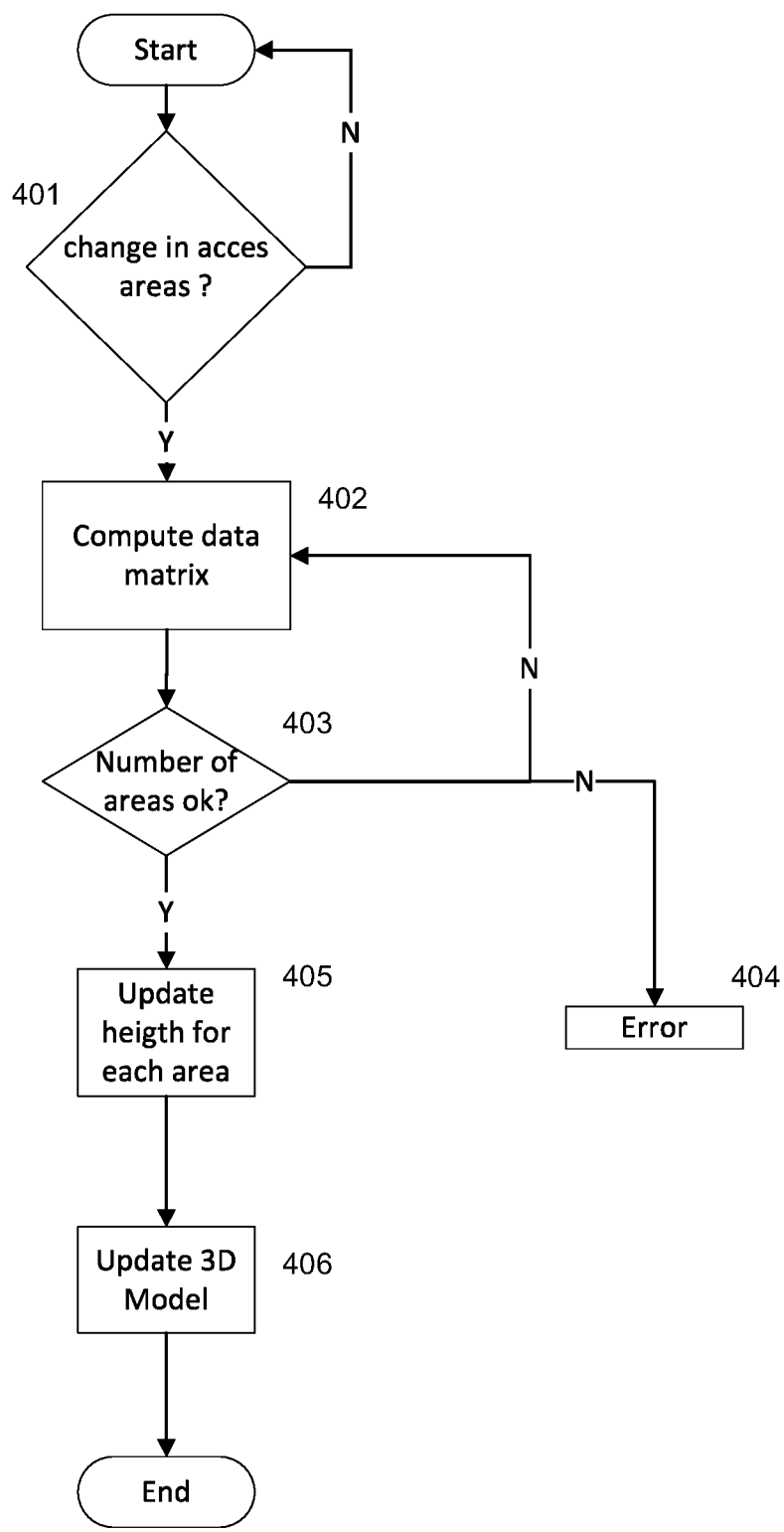
FIG. 4 illustrates an example of a flowchart for maintaining a 3D model of a hoisting area.

Referring to FIG. 4, an example of a flowchart of a process for maintaining a 3D model of a hoisting area is shown. The process may be triggered by a change 401 in the number of access areas, a change in the dimensions of access areas, or in the status change of forbidden access areas. The process then proceeds with computing a data matrix 402, which represents the hoisting area as a 2-dimensional surface wherein various areas are delimited. The areas may represent obstacles, walkways, deployment zones and all other type regions and/zones.

In order to keep the number of different areas manageable, the process may optionally include a check 403 on whether a maximum number is not exceeded. If the maximum is exceeded an error 404 may be notified and the data matrix may be re-computed to aggregate particular areas.

If the number is ok, or if the check 403 is not performed, the process continues with updating 405 the height for each respective area. Once the height for each area is updated, the 3D model is updated with the respective heights; or at least the heights for the areas that are accessible. As if an area is forbidden, off-limit or for other reasons not accessible, the height is irrelevant as the crane may not travel over or through the area.

Figure 5:
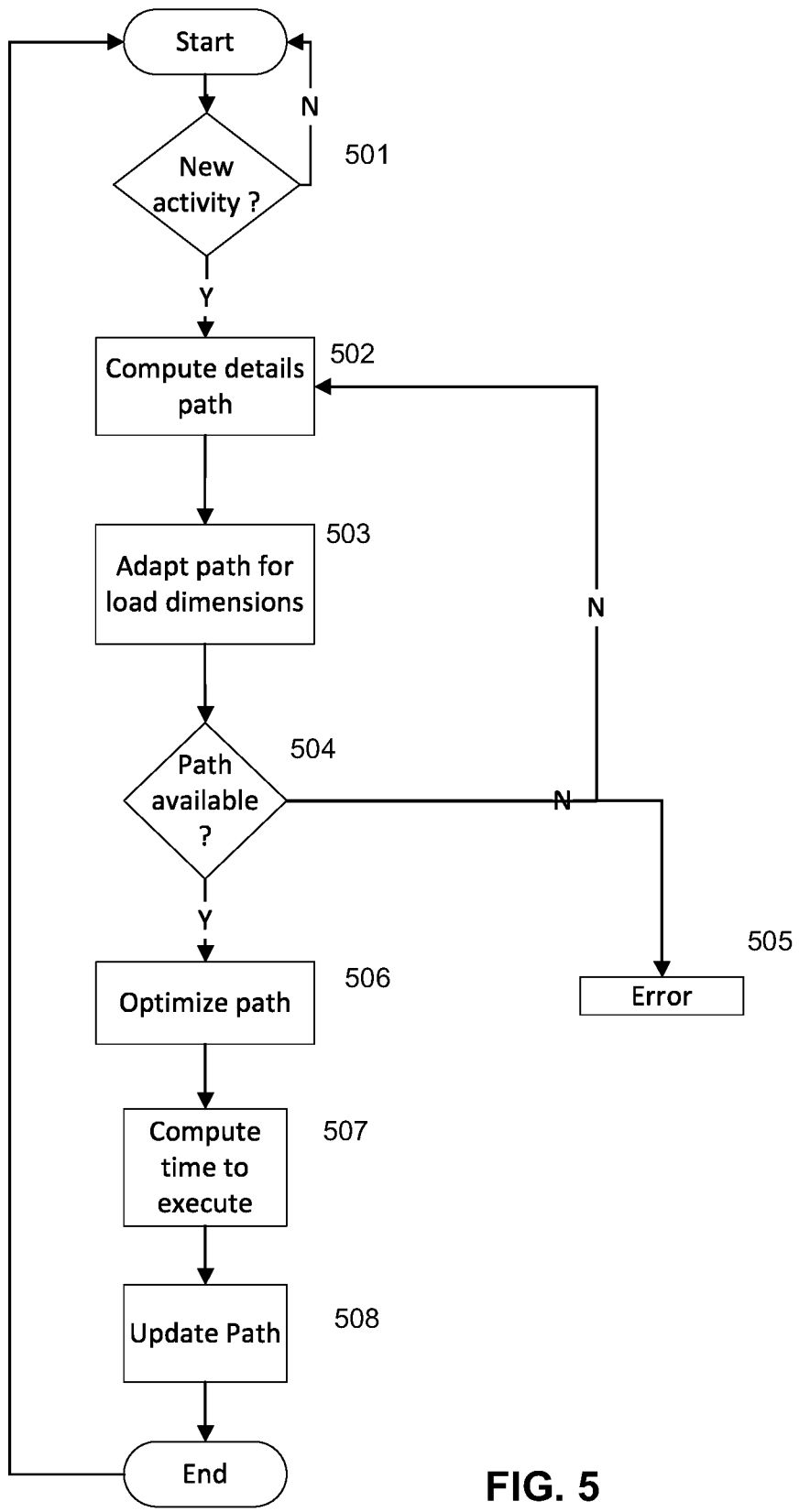
FIG. 5 illustrates an example of a flowchart for finding a path.

Referring to FIG. 5, an example of a flowchart of a process for finding a path is shown. The process is initiated when a new task is requested 501 for transporting a load from a starting position to a target position. Then an initial path is computed 502 using for example Dijkstra's shortest path first algorithm as known in the art. The initial path is then adapted 503 to take in account the dimensions of the intended load.

Availability of the path is then checked 504; for example whether the path is not blocked due to e.g. load height, diameter or due to restricted access. If not available an error is notified 505 and a new path may be computed 502. If the initial path is available, the path may be optimized 506 for travelling time by determining locations of acceleration and/or deceleration for passing through each access area.

The path as optimized may be used to determine the amount of time 507 required to execute the path. The calculated travel time is made available to the overall supervisory system of the hall to allow planning further activities of the crane in question and of other machinery, including additional cranes, present in the hall. Accordingly, the optimized path is updated 508 with the execution time to allow further coordination with other tasks requested.

Figure 1:
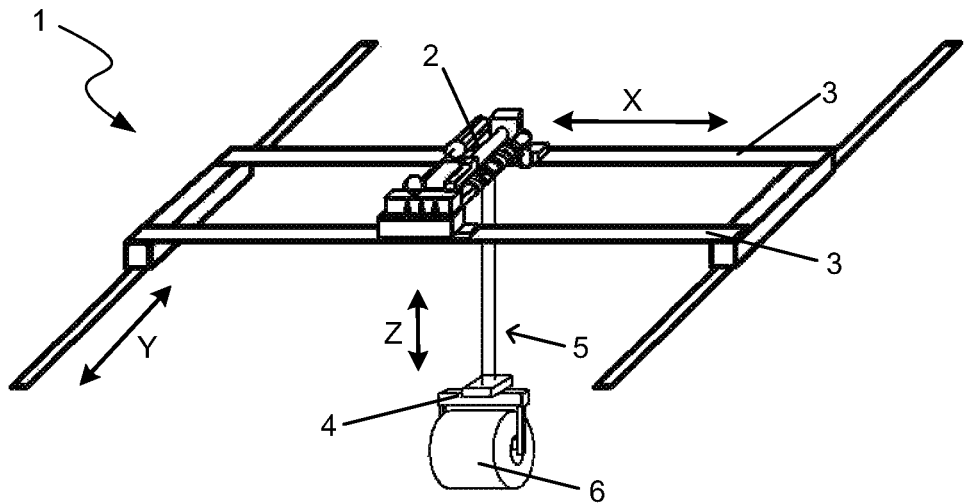
FIG. 1 illustrates schematically an example of a hoisting appliance.
Figure 6:
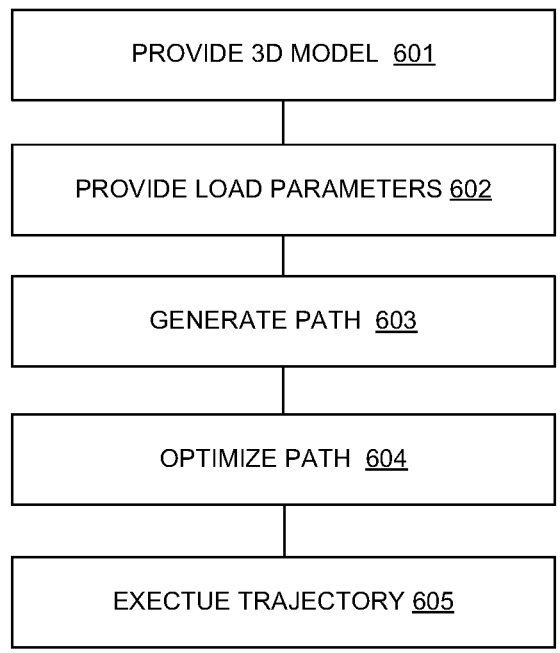
FIG. 6 illustrates an example of a method for generating a trajectory for a load transported by a hoisting appliance.

Referring to FIG. 6, a general example of a method for creating and executing a trajectory for a crane in a hoisting area is shown. The method includes providing 601 a 3D model of the hoisting area, which model may be a representation as a set of 3-dimensional blocks or cubes. The 3D model may be defined by a coordinate system, wherein each block has an X-, Y- and Z-coordinate. Within the 3D-model obstacles are located by indicating the XYZ-coordinates that define the space that each obstacle occupies. For located objects the 3D model may define one or more object parameters, such as length, height, width and/or weight, speed, orientation, and direction of the object; and/or a safety margin of the object. In addition, the 3D model may include restricted area data relating to one of the located objects. This restricted area data may be obtained as an area diminishing over time or as defined positions with a safety margin at consecutive instances of time.

The method further includes providing 602 load parameters, e.g. by the supervisory system, and may include weight and dimensions like length, height, and width of the load. These parameters may be entered by an operator in advance or provided by scanning equipment mounted on the crane or hoisting appliance.

Next, a trajectory is generated 603 for navigating through the hoisting area using the model of the hoisting area. The trajectory generation 603 may take in account located objects, load parameters and load movement parameters. The load movement parameters may include a maximum attainable speed of the hoist appliance with the load. The maximum attainable speed may depend on load parameters, such as weight and other dimensions. Load movement parameters may further include maximum acceleration, maximum speed, maximum deceleration, and/or maximum sway for the load in dependence of hoisting height. The trajectory will include a starting point, a target point and a number of consecutive line segments connecting the starting point and the target point. The trajectory may be generated using an algorithm, it may be selected from a pre-determined set of paths, or from other prior stored path data. When using an algorithm, such as Dijkstra's algorithm, generating 603 the trajectory may include selecting the shortest path from all possible paths. In general, a Dijkstra's algorithm or any other algorithm will provide multiple possible paths from point A to point B.

The generated trajectory may be optimized for speed by maximizing the length of at least one line segment in a main direction of travel in order to travel at a maximum attainable speed of the hoisting appliance with the load in the main direction of travel, as will be explained below. The optimized trajectory is accordingly executed 605 by the hoisting appliance.

For sake of clarity the method will be explained further below using examples in 3-dimensional space within the same plane of height, meaning the Z-coordinate or height is not variated. It should be noted that the method may be equally applicable in 3-dimensions, i.e. with variations in height i.e. the Z-direction.

Figure 7:
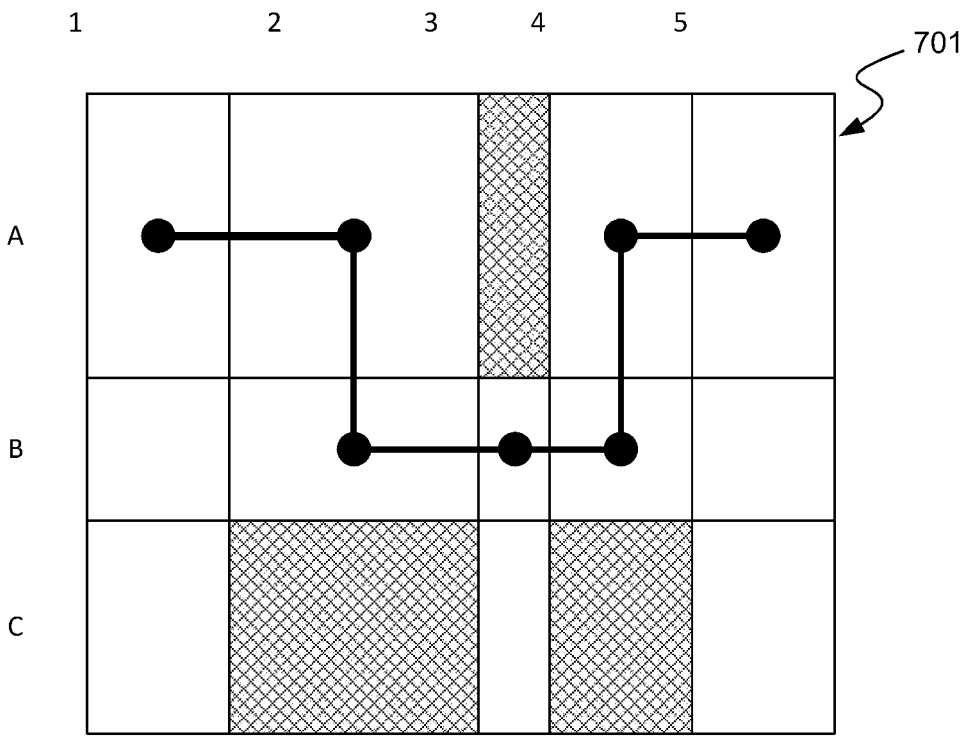
FIG. 7 illustrates an example of a path in a model of hoisting area.
Figure 8:
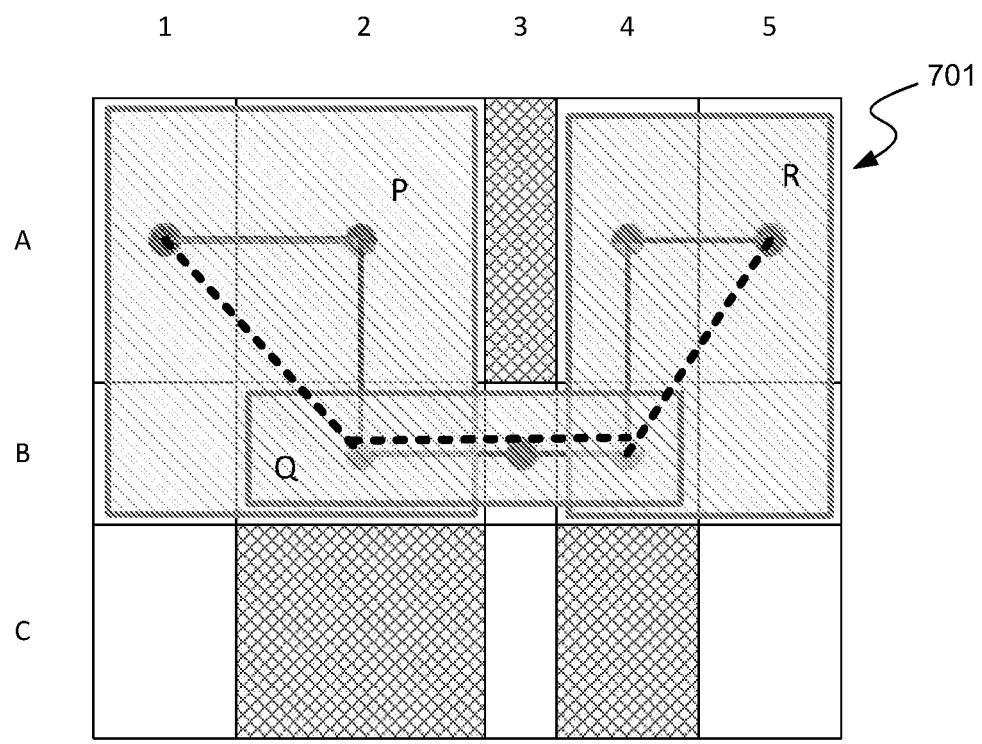
FIG. 8 illustrates an optimization of the path of FIG. 7.

Referring to FIG. 7, an example of a first path obtained via Dijkstra's algorithm is shown. The hoisting area 701 in top-view is modelled by cubes A1-A5, B1-B5 and C1-C5 of various sizes. Obstacles or restricted areas are indicated by hatching. The obtained first path from starting position A1 to target position A5 runs as: A1-A2-B2-B3-B4-A4-A5. This path may be optimized by taking in account non-restricted areas, resulting in merging of unrestricted areas P, Q and R, as seen in FIG. 8. For unrestricted area P, this allows skipping crossing point A2 in between point A1 and B2. Similarly, for unrestricted area R, this allows skipping crossing point A4 in between point B4 and A5. Also for unrestricted area Q, this allows skipping crossing point B3 in between point B2 and B4, as the hoist does not need to stop or slow down at that the crossing point. For the paths from point A1 to B2 and from B4 to A5, the path optimized for length results in a diagonal trajectory, thereby reducing the number of corners at perpendicular angles.

As can be understood, apart from and/or in addition to reducing line segments, the trajectory may be optimized in further ways as for example by adding line segments, by removing line segments or by adjusting line segments, if this enhances the path over which the hoisting appliance may travel at maximum speed in the main direction of travel.

Figure 9:
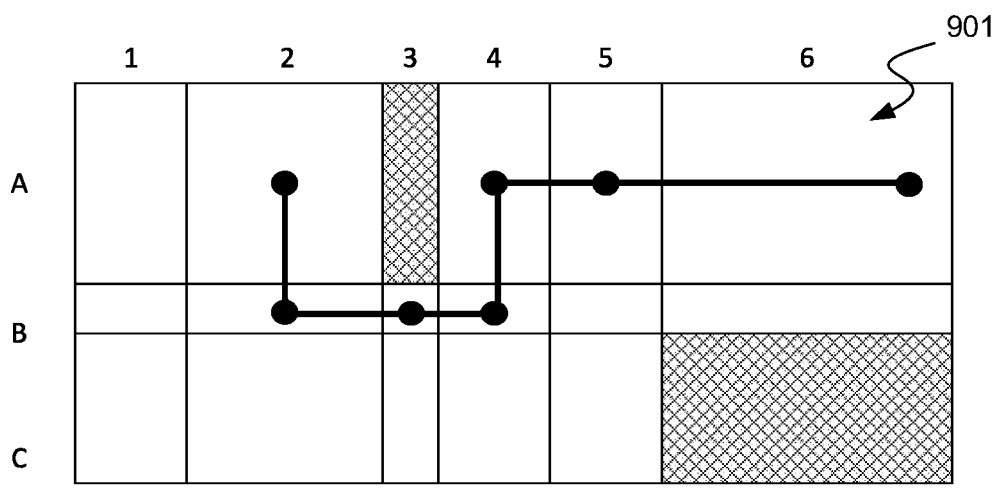
FIG. 9 illustrates another example of a path in a model of hoisting area.
Figure 10:
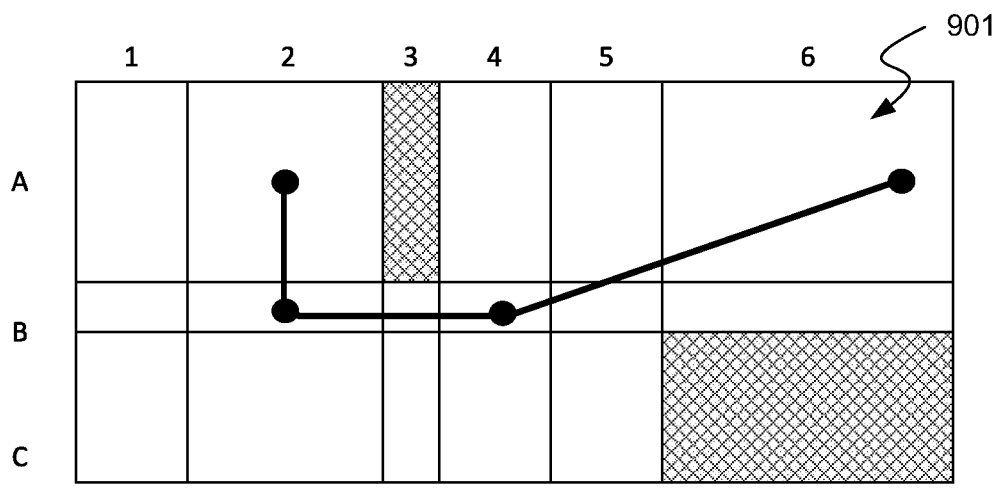
FIG. 10 illustrates an optimization of the path of FIG. 9.
Figure 11:
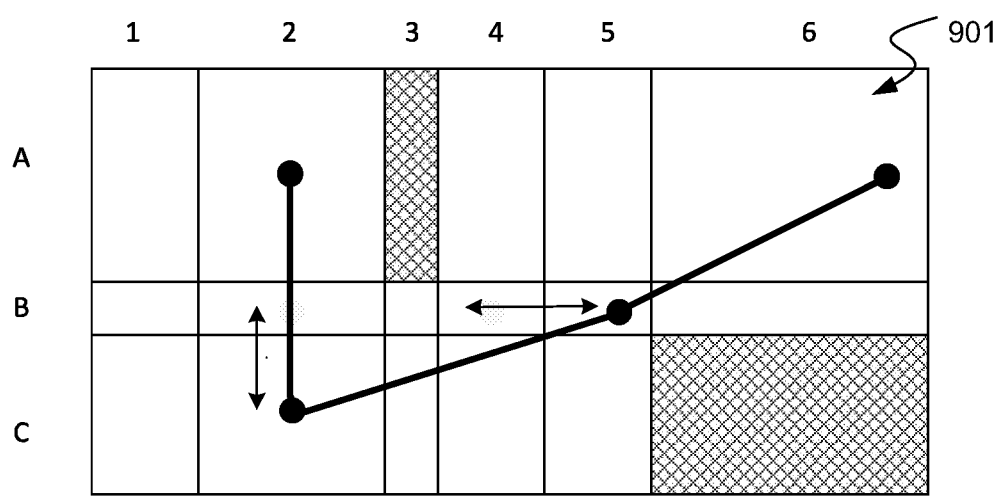
FIG. 11 illustrates a further optimization of the path of FIG. 10.

Referring to FIG. 9, another example of a path optimized for length is shown. The first Dijkstra path may have been either A2-B2-B3-B4-B5-A5-A6, or A2-B2-B3-B4-A4-A5-A6. For both of which after being optimized, a resulting optimized trajectory may be A2-B2-B4-A6, as shown in FIG. 10. This first path optimized for length may be further optimized for maximum travelling speed, by reducing the number of line segments and associated corner points. As can be seen in FIG. 11, the first optimized path may be further adapted to A2-C2-B5-A6. Which reduces the number of line segments and thereby allows travelling of the crane in the same direction for a longer time, meaning less deceleration and a longer time period of travelling at maximum high speed. As before cornering the crane will need to decelerate and after cornering will need to accelerate, reducing line segments and associated corners will increase the path length along which the crane may travel at maximum high speed. Which reduces the total time required for travelling from starting position to target position.

Figure 12:
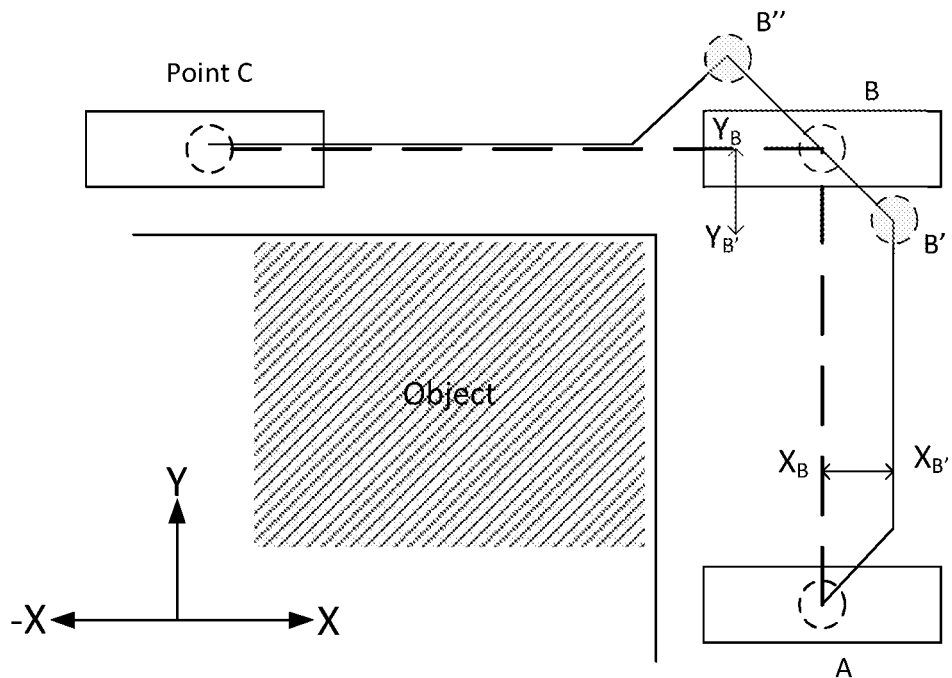
FIG. 12 illustrates another example of optimizing a path.

Referring to FIG. 12, path optimization my further include taking in account the next line segment and the potentially maximum speed attainable thereon. The crane travelling from starting position A to target position C, will need travel distance Y and distance −X, thereby crossing point B. In order to maximize speed in the −X direction, it may be calculated that in order for the crane to travel at maximum high speed in −X direction, the crane, while moving in direction Y will move in direction +X, such that the distance travelled in +X will be enough for the crane to achieve maximum high speed when moving at point B' in the −X direction.

Similarly, when arriving at point B', the crane may delay decelerating in direction Y until no further distance in direction Y needs to be travelled or even delay decelerating beyond the required distance Y. As during the travelling in −X direction at maximum high speed, the distance overshoot in the Y direction may be corrected, as that is no longer the main direction of travel.

Hence, from point B' the hoist may travel to point B by slowing down in the Y-direction and travel from there to point C. Or from point B' the hoist may travel to point B" at maximum speed in the Y-direction, only to slow down after passing through point B and travel from point B" to point C.

In either way, advantage is taken of the fact that the speed of travel in X, Y, and Z direction are independent of each other. Whereas in contrast with e.g. a car taking a corner, the speed in X and Y are interdependent.

Figure 13:
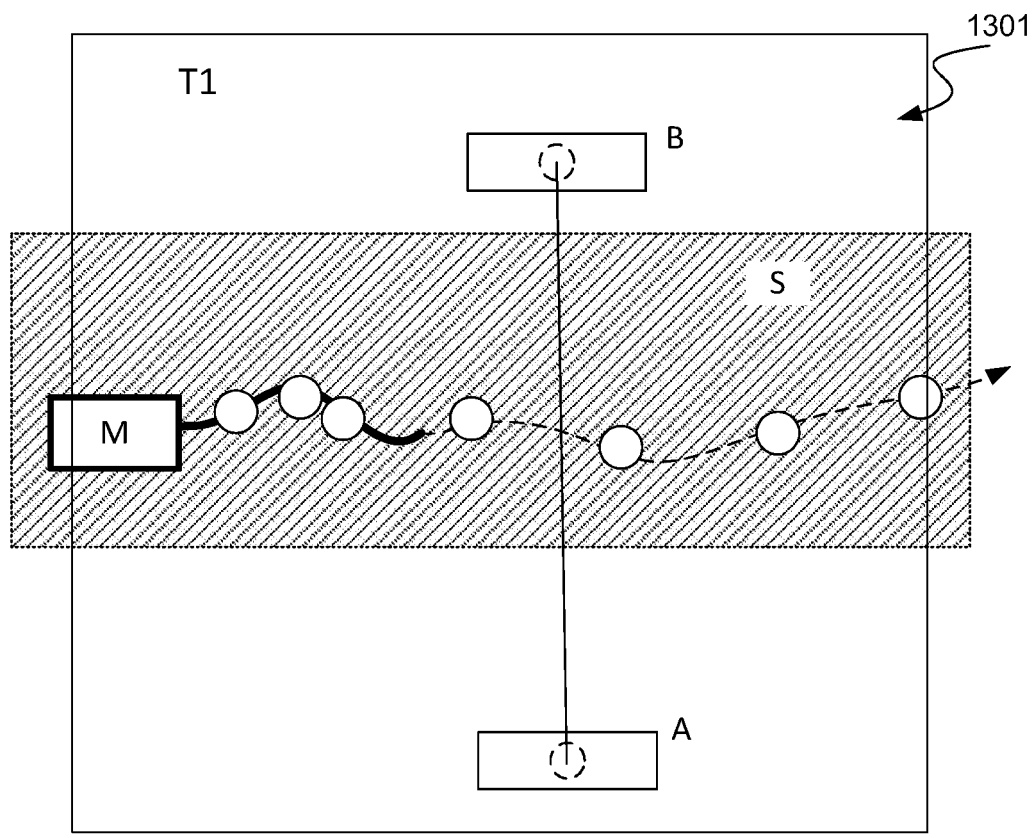
FIG. 13 illustrates an example of a model of a hoisting area with a moving object.
Figure 14:
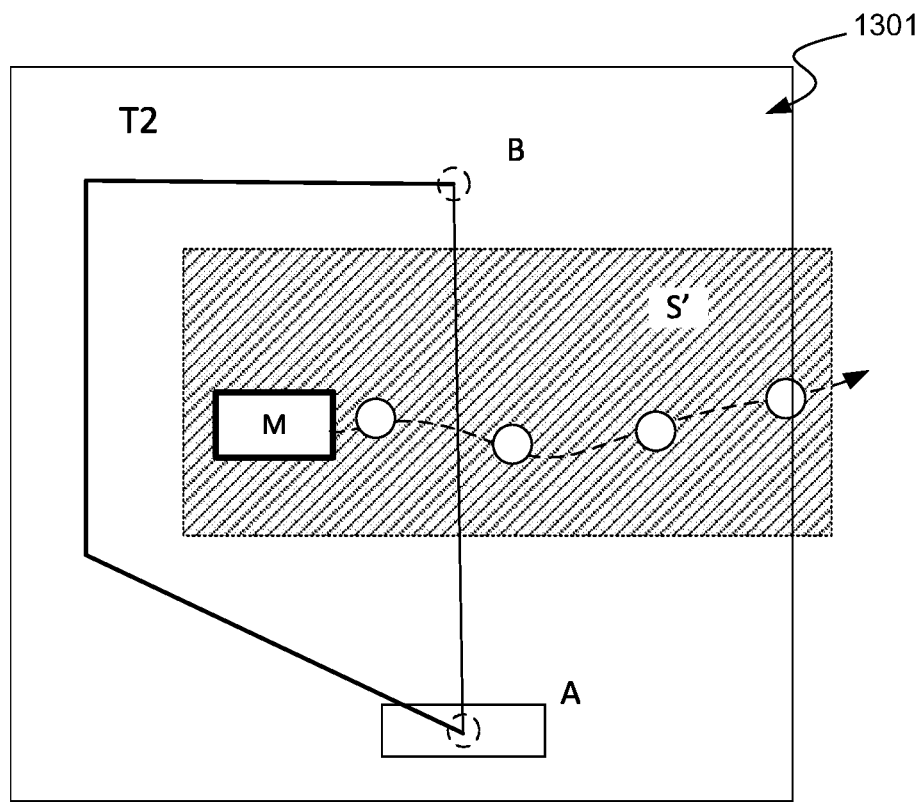
FIG. 14 illustrates an example of finding a path in the model of FIG. 13.
Figure 15:
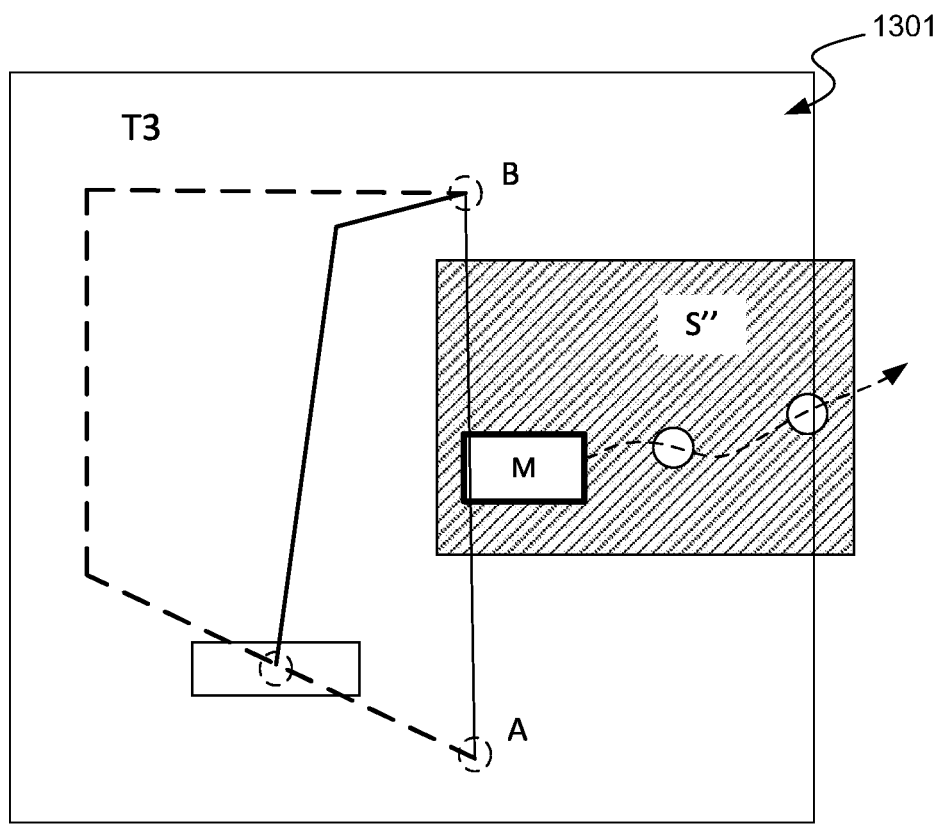
FIG. 15 illustrates an example of adapting the path in the model of FIG. 14.

Yet another manner in which travelling time of the path may be optimized is by circumvention of moving obstacles, instead of stopping and waiting for moving obstacles to clear the way. Referring to FIG. 13, a restricted area S in a hoisting area 1301 indicates the area through which moving obstacle M will be travelling. As shown in FIGS. 14 and 15, the restricted area is known to the supervisory control system as a restricted area that diminishes as function of time. Hence, FIG. 13 shows the restricted area S at time T1, FIG. 14 shows the restricted area S' at time T2 and FIG. 15 shows the restricted area S" at time T3.

The shortest path length from starting position A to target position B would be a straight line. But due to the restricted area S at time T1, no possible path is available. A first solution will occur at time T2 as shown on the FIG. 14. The diminution of the restricted area from S to S' allows the trajectory algorithm to find a possible path. As the method will allow continuous updating of restricted areas in the 3D model of the hoisting area, the trajectory may be adapted as shown in FIG. 15 once the moving obstacle has cleared the way as indicated by the diminished restricted area S".

This manner of optimization allows an optimization based on the path of the moving object, which path would be known from the supervisory system of the yard or hall. In addition; the travelling time of the moving obstacle may be known, though it is not necessarily required to perform optimization.

Referring to FIGS. 16-19, another example for generating a path is shown. In this example, the restricted area of the moving obstacle M is represented as consecutive small areas at time instances T1-T4. Whereas in the example of FIGS. 13-15 the path of the moving obstacle M and the associated restricted area is only known in advance as a restricted area diminishing over time by the supervisory system, this example shows how the method may perform when such path of the moving obstacle M is more fully known in advance, meaning the trajectory of the moving obstacle and defined positions of the object M at consecutive instances of time. The defined position of the object M may include a safety margin. Such predictive information may be acquired from external systems able of predicting or interpolating paths of moving obstacles. These systems may employ Artificial Intelligence or other suitable technology capable of providing trajectories.

Figure 16:
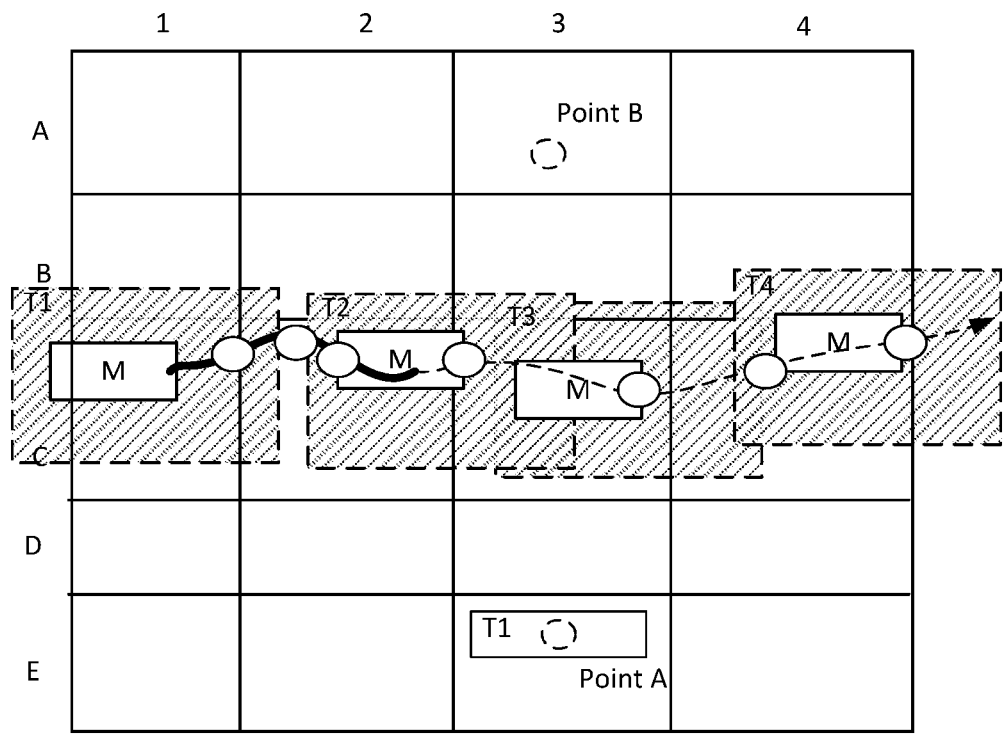
FIG. 16 illustrates an example of another model of a hoisting area with a moving object.

In FIG. 16, the trajectory of a mobile object M in a hoisting area is shown, as well as the starting and the target point of a crane intended for transporting a load across the hoisting area. The safety margin of the moving object or obstacle M is indicated as a shaded box with dotted outline.

Figure 17:
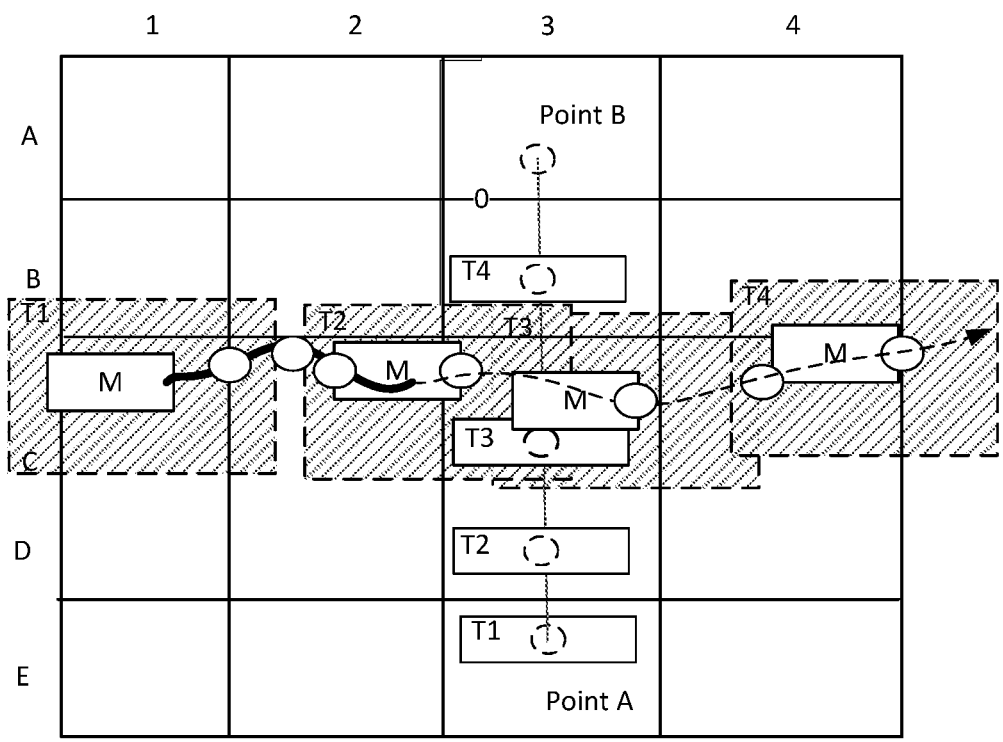
FIG. 17 illustrates an example of a shortest path in the model of FIG. 16.
Figure 18:
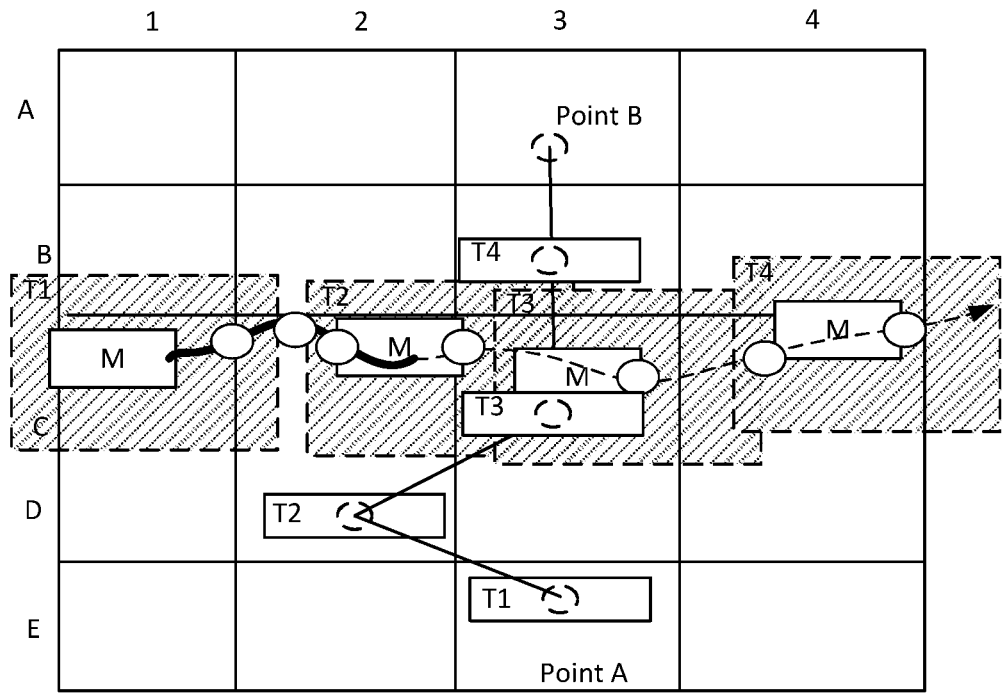
FIG. 18 illustrates an example of an adapted path in the model of FIG. 16.
Figure 19:
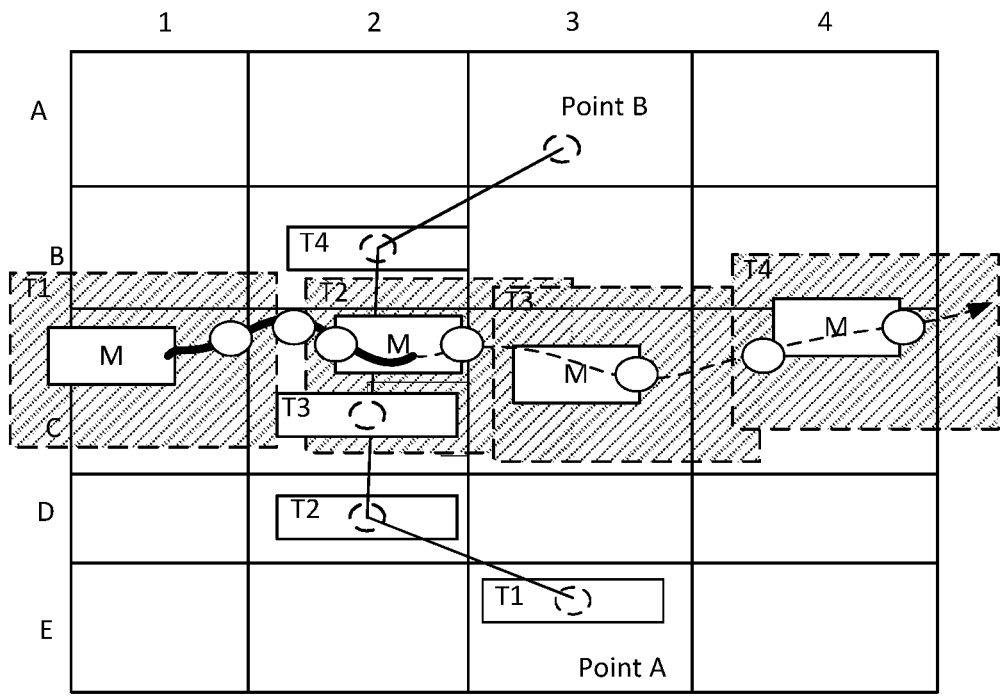
FIG. 19 illustrates an example of finding an optimized path in the model of FIG. 16.

In FIG. 17, the first path for the crane from starting position E3 at time T1 to target position A3 at T4 is shown. The moving obstacle M is at position C1 at time T1. Prediction of the moving obstacle path and the crane shortest path foresees collision at position C3 at time T3. Accordingly, the next crane path that would be suggested using Dijkstra's algorithm, would mean moving from position E3 to position D2 at time T2. Then, as a next possible move, the crane travelling to position C3 might be evaluated, but again that would be prevented due to the restricted area associated with the location of the moving obstacle M at time T3, as shown in FIG. 18. Accordingly, as next possible move, the crane travelling to position C2 would be evaluated, which would not be prevented as no restricted area associated with moving object M interferes therewith, as shown in FIG. 19. Moving on, the method for generating a path would continue to position B2 at time T4, to finally arrive a target position A3 at time T5.

This stepwise approach using e.g. Dijkstra's algorithm allows dealing with moving objects on the fly. This could be used as a sub-routine, when e.g. a newly identified moving objects would interrupt the current crane path being executed. This manner of optimization allows an advanced optimization, an optimization based on both the path and travelling time of the moving object, which both would be known form the supervisory system of the yard or hall.

These various or additional manners of generating the trajectory using an algorithm like Dijkstra's, as explained above, may be further enhanced by the optimization for speed as explained in relation to FIG. 11. Hence, increasing the length of one or more line segments in one of the three main directions of movement X, Y, Z, to be able to travel at maximum speed in the respective direction along that line segment.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In particular it should be understood, that thought the method as described above has been explained with examples without variations in height, i.e. the Z-direction, the method may be equally applicable in 3-dimensions, i.e. 3D.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for generating a trajectory for a load transported by a hoisting appliance spanning a hoisting area, the method comprising:
    providing a 3-dimensional model of the hoisting area, the model comprising located objects within the hoisting area;
    providing load parameters;
    generating a trajectory for navigating through the hoisting area using the model of the hoisting area and taking in account:
    located objects;
    load parameters; and
    load movement parameters comprising a maximum attainable speed of the hoist appliance with the load;
    wherein the trajectory comprises a starting point, a target point and a number of consecutive line segments connecting the starting point and the target point;
    optimizing the trajectory for speed by maximizing the length of at least one line segment in a main direction of travel in order to travel at a maximum attainable speed of the hoisting appliance with the load in the main direction of travel.

2. The method according to claim 1, wherein the trajectory is generated using a Dijkstra algorithm.

3. The method according to claim 1, wherein the load parameters comprise load length, height, width and weight.

4. The method according to any of claim 1, further comprising determining load movement parameters from load parameters, the load movement parameters comprising:
    maximum acceleration, maximum speed, maximum deceleration, and/or maximum sway for the load in dependence of hoisting height.

5. The method according to claim 1, wherein the 3-dimensional model comprises for located objects one or more object parameters comprising:
    length, height, width and/or weight;
    speed, orientation, and direction of the object; and/or
    a safety margin of the object.

6. The method according to claim 1, further comprising:
    obtaining restricted area data associated with an object as an object parameter of a respective object;
    wherein the restricted area data is provided:
        as an area diminishing over time; or
        as defined positions with a safety margin at consecutive instances of time.

7. The method according to claim 1, further comprising:
    obtaining an update of the 3-dimensional model comprising restricted area data;
    generating an updated trajectory for navigating through the hoisting area using the model of the hoisting area;
    optimizing the updated trajectory for speed.

8. The method according to claim 1, wherein the optimizing for speed further comprises taking in account an optimal hoisting height.

9. The method according to claim 1, wherein the optimizing for speed further comprises:
    reducing line segments;
    adding and/or removing line segments;
    adjusting line segments.

10. A control device for a hoisting appliance, configured for performing the method according to claim 1.

11. A hoisting appliance comprising a control device according to claim 10.

12. A hoisting crane comprising a hoisting appliance according to claim 11.

13. A non-transitory computer readable storage medium, with a computer program stored thereon, said computer program comprising instructions for, when executed by a processor, carrying out the method according to claim 1.

* * * * *